United States Patent [19]

Nakagawa

[11] 4,294,526
[45] Oct. 13, 1981

[54] AUTOMATIC FOCUSING CAMERA COMBINED WITH MANUAL FOCUSING SYSTEM

[75] Inventor: Tadashi Nakagawa, Yotsukaido, Japan

[73] Assignee: Seiko Koki Kabushiki Kaisha, Tokyo, Japan

[21] Appl. No.: 188,115

[22] Filed: Sep. 17, 1980

[30] Foreign Application Priority Data

Oct. 27, 1979 [JP] Japan .............................. 54-148913[U]

[51] Int. Cl.$^3$ ............................. G03B 3/10; G03B 7/08
[52] U.S. Cl. ......................................... 354/25; 354/195
[58] Field of Search ................... 354/234, 235, 195, 25

[56] References Cited

U.S. PATENT DOCUMENTS 4,231,647 11/1980 Kitai et al. ............................ 354/195
4,231,648 11/1980 Kitai et al. ............................ 354/195

FOREIGN PATENT DOCUMENTS 2849811 5/1979 Fed. Rep. of Germany ...... 354/195

Primary Examiner—Donald A. Griffin
Attorney, Agent, or Firm—Robert E. Burns; Emmanuel J. Lobato; Bruce L. Adams

[57] ABSTRACT

An automatic focusing camera comprises an automatic focus detecting electronic circuit for detecting the distance between the camera and an object, an electromagnet controlled by said circuit, a release member actuated interlocking with shutter release operation and adapted to actuate the shutter at the end of the operation, an armature lever controlled by said electromagnet to operate between a resting position and a taking lens focusing position interlocking with said release operation, a locking means which locks the shutter actuating operation of said release member with said armature lever at said resting position and allows the actuation of the shutter at the taking lens focusing position, and a selecting means for selecting between automatic focusing mode and manual focusing mode adapted to retract said locking means to a position where said locking means will not lock said release member when said manual focusing mode is selected.

1 Claim, 1 Drawing Figure

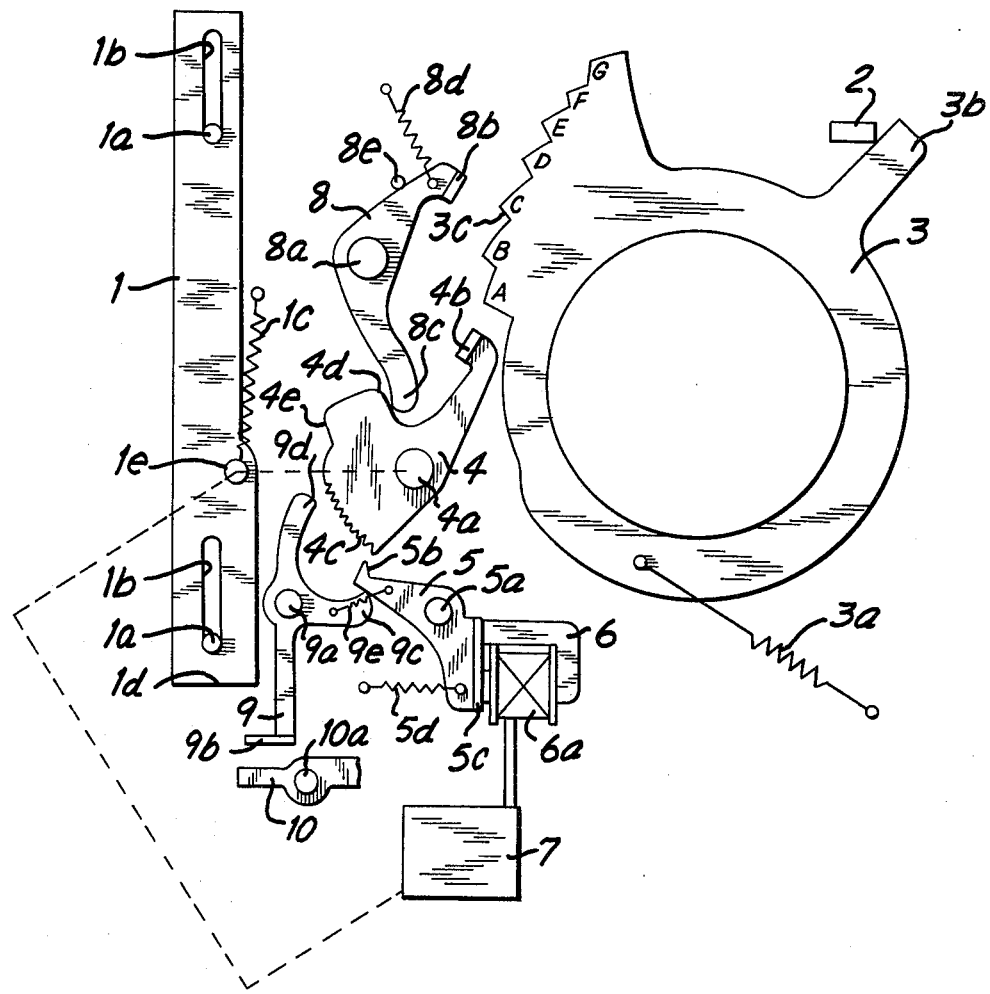

AUTOMATIC FOCUSING CAMERA COMBINED WITH MANUAL FOCUSING SYSTEM

BACKGROUND OF THE INVENTION

This invention relates to a safety device for the automatic focusing camera capable of automatically focusing the taking lens.

The automatic focusing camera capable of automatically focusing the taking lens by detecting the distance between the camera and an object has been widely propagated owing to its facility, however, the conventional automatic focusing camera has a problem that the automatic focusing function becomes entirely inoperable and malfunction is caused when the battery is consumed or electrical fault is caused as the electrical range detection and electrical processing are used.

Accordingly, an object of the present invention is to provide a camera wherein when the control system is inoperable due to battery exhaustion or the malfunction of the focus detecting system, successive operation is locked to warn the photographer and the camera becomes operable when the manual focusing mode is selected.

BRIEF DESCRIPTION OF THE DRAWING

The single FIGURE of drawing is a schematic illustration of the essential part of a preferred embodiment according to the present invention.

Referring to the drawing, a release plate 1 provided with an edge 1d and an interlocking pin 1e is slidably guided by pins 1a fitted in respective slots 1b against a spring 1c.

A setting plate 2, partly shown, is supported to move leftward starting from a charged position as shown in focusing operation.

A ring 3 provided with a projection 3b to be engaged with the setting plate 2 and a cam part 3c comprising cams A, B, C, D, E, F and G corresponding to respective focus positions of the taking lens is rotative about the optical axis of the taking lens and urged counterclockwise by a spring 3a.

An adjusting lever 4 provided with a bend 4b to be engaged with the cam part 3c, ratchet teeth 4c, operating cam 4d and a raising cam 4e is rotative about a shaft 4a and interlocked with the interlocking pin 1e by known means.

An armature lever 5 provided with a pawl 5b to be engaged with the ratchet teeth 4c and a magnetic part 5c is rotative about a shaft 5a and urged clockwise by a spring 5d. In the charged state as shown, the magnetic part 5c is pressed against an electromagnet 6 by known means.

The coil 6a of the electromagnet 6 is connected to a focus detecting electronic circuit 7 which cuts off the electric current supplied to the coil 6a at the moment of focus detection.

A selecting member 8 provided with a bend 8b to be engaged with the cam part 3c and an arm 8c to be engaged with the operating cam 4d is rotative about a shaft 8a, urged counterclockwise by a spring 8d and resting on a fixed pin 8e.

A locking lever 9 provided with a bend 9b to be engaged with the edge 1d of the release plate 1, a projection 9c to be engaged with the armature lever 5 and an arm 9d to be engaged with the raising cam 4e is rotative about a shaft 9a and urged counterclockwise by a spring 9e extending between the armature lever 5 and the locking lever 9.

A release lever 10 is rotative about a shaft 10a and adapted to actuate the shutter.

In operation, as the release plate 1 is pushed downward against the spring 1c in interlocking relation with the shutter button operation, the interlocking pin 1e actuates the focus detecting electronic circuit 7 to excite the coil 6a and magnetize the electromagnet 6 so that the magnetic part 5c is attracted and held by the electromagnet 6. Subsequently, the pressing on the armature lever 5 against the electromagnet 6 is cancelled by known means so that the armature lever 5 is controlled by the electromagnet 6 against the spring 5d.

Meanwhile, the interlocking pin 1e turns the adjusting lever 4 counterclockwise about the shaft 4a. When a focus detection signal is produced by the electronic circuit 7, the electric current supplied to the coil 6a is cut off so that the electromagnet 6 is unmagnetized. At the moment the electromagnet is unmagnetized, the spring 5d turns the armature lever 5 clockwise about the shaft 5a to make the pawl 5b engage with one of the ratchet teeth 4c so that the adjusting lever 4 is restrained at a position with the bend 4b positioned corresponding to one of the cams of the cam part 3c.

The locking lever 9 is turned counterclockwise about the shaft 9a being pulled by the spring 9e with the projection following the armature lever 5 so that the bend 9b escapes from the operating range of the edge 1d of the release plate 1.

As the release plate is pushed downward further, the edge 1d pushes the release lever 10 to turn the release lever counterclockwise about the shaft 10a thus actuating the shutter.

As the setting plate 2 moves leftward after the shutter has been actuated, the projection 3b follows the setting plate 2 so that the ring 3 is turned counterclockwise by the spring 3a together with the taking lens and finally stopped by the bend 4b engaging with a cam of the cam part 3c at a position corresponding to the focus position of the taking lens.

At the end of the operation of the setting plate 2, the shutter operates to perform an exposure in the known manner. When the depression on the release plate 1 is cancelled, the release plate 1 is restored to the starting position as shown by the spring 1c.

In recharging the system, the setting plate 2 is moved rightward pushing the projection 3b to turn the ring 3 clockwise against the spring 3a and at the same time, the armature lever 5 is turned counterclockwise against the spring 5d until the magnetic part 5c is pressed against the electromagnet 6 thus every component being set at the charged position as shown.

The heretofore described operation is the normal operation under the control of a focus detection signal. Explanation will be made hereinafter of the operation of the system when the electronic circuit fails to produce a focus detection signal. Although the adjusting lever 4 is turned counterclockwise by the interlocking pin 1e, the electromagnet 6 remains magnetized as the electronic circuit 7 does not produce a focus detection signal, therefore, the locking lever 9 remains as it stands. Consequently, the downward movement of the release plate 1 is obstructed by the bend 9b of the locking lever 9 at the edge 1d, thus warning the photographer that the camera is inoperable.

Then, if the selecting member 8 is turned clockwise against the spring 8d, the bend 8b enters into the operating range of the cam part 3c to limit the counterclockwise turning of the ring 3, while the arm 8c pushes the adjusting lever 4 at the operating cam 4d to turn the adjusting lever 4 counterclockwise so that the bend 4b is retracted from the operating range of the cam part 3c and the raising cam 4e pushes the arm 9d to turn the locking lever 9 counterclockwise thus retracting the bend 9b from the operating range of the edge 1d. Thus the taking lens is manually focused by the action of the bend 8b and at the same time, successive operation of the release plate 1 is allowed as the bend 9b is removed out of the passage of the release plate 1. Consequently, photographing operation is possible by selecting the manual focusing mode by changing the selecting member to the manual mode position if the automatic focusing system is inoperative.

It is obvious that the locking lever 9 and the armature lever 5 can be integrated into a single member by providing the actions of the bend 9b and the arm 9d for the armature lever 5.

Further, the electronic circuit may be adapted to magnetize the electromagnet when the focus detection signal is produced and the release plate may be adapted to be allowed to be depressed when the armature lever is attracted to the electromagnet.

Thus, according to the present invention, the possibility of successive operation of the release plate is examined by the action of the electromagnet, the photographer is warned of the failure of the electronic system and if the automatic focusing is interrupted, the system can be changed to manual focusing mode thus allowing photographing operations so that incorrect photographing caused by the malfunction of the automatic focusing system is prevented and the availability of the automatic focusing camera is expanded.

I claim:

1. An automatic focusing camera comprising an automatic focus detecting electronic circuit capable of detecting the distance between the camera and an object and automatically focus the taking lens, an electromagnet controlled by said electronic circuit, a release member actuated in interlocking relation with the shutter release operation and operative to actuate the shutter at the end of the operation of the same, an armature lever controlled by said electromagnet to operate between a resting position and a taking lens focusing position in interlocking relation with said release operation, a locking means which locks the shutter actuating operation of said release member with said armature lever at said resting position and allows the actuation of the shutter at the taking lens focusing position, and a selecting means for selecting between automatic focusing mode and manual focusing mode and operative to retract said locking means to a position where said locking means will not lock said release member when said manual focusing mode is selected.

* * * * *